US011926455B1

(12) United States Patent
Schwimer et al.

(10) Patent No.: US 11,926,455 B1
(45) Date of Patent: Mar. 12, 2024

(54) SOUND DEVICE FOR BEVERAGE CONTAINER

(71) Applicant: Kevin Schwimer, Beverly Hills, CA (US)

(72) Inventors: Kevin Schwimer, Beverly Hills, CA (US); Henning Zieger, Pasadena, CA (US)

(73) Assignee: Kevin Schwimer, Beverly Hill, CA (US)

(*) Notice: Subject to any disclaimer, the term of this patent is extended or adjusted under 35 U.S.C. 154(b) by 222 days.

(21) Appl. No.: 17/465,754

(22) Filed: Sep. 2, 2021

Related U.S. Application Data

(60) Provisional application No. 63/073,508, filed on Sep. 2, 2020.

(51) Int. Cl.

| | |
|---|---|
| ***B65D 51/24*** | (2006.01) |
| ***B65D 17/00*** | (2006.01) |
| ***B65D 17/28*** | (2006.01) |
| ***B65D 51/16*** | (2006.01) |
| ***G08B 21/00*** | (2006.01) |

(52) U.S. Cl.
CPC ........... *B65D 51/248* (2013.01); *B65D 17/02* (2013.01); *B65D 17/28* (2018.01); *B65D 51/16* (2013.01); *B65D 2517/0056* (2013.01); *G08B 21/00* (2013.01)

(58) Field of Classification Search
CPC ........................... B65D 51/248; B65D 55/028; B65D 51/1633; B65D 51/16
See application file for complete search history.

(56) References Cited

U.S. PATENT DOCUMENTS

| | | | | |
|---|---|---|---|---|
| 3,203,136 | A * | 8/1965 | Scray | A63H 5/00 215/44 |
| 3,230,661 | A * | 1/1966 | Gleason | A63H 5/00 222/39 |
| 4,121,835 | A | 10/1978 | Garabedian | |
| 4,398,491 | A | 8/1983 | Fridl et al. | |
| 4,801,929 | A | 1/1989 | Instance | |
| 4,886,185 | A | 12/1989 | Chuan | |
| 5,099,232 | A | 3/1992 | Howes | |
| 5,130,696 | A | 7/1992 | Liebman | |
| 5,388,718 | A | 2/1995 | Lo | |
| 5,464,092 | A | 11/1995 | Seeley | |

(Continued)

*Primary Examiner* — Jeffrey R Allen

(74) *Attorney, Agent, or Firm* — DeLio Peterson & Curcio LLC; Kelly M. Nowak

(57) ABSTRACT

A sound producing beverage container including a top surface having an opening in the surface initially sealed with a closure. The sound producing beverage container includes a reed assembly mounted to the top surface. The reed assembly includes a substantially flat reed having opposing leading and trailing reed edges. The reed assembly includes a bridge disposed adjacent the reed. The bridge includes opposing leading and trailing bridge edges and a bulge in the bridge along the leading edge of the bridge, the bulge extending away from the reed. A portion of the leading edge of the reed is disposed between the container top surface and the bridge. A gas moving along the device surface toward the leading edge of the bridge may be directed toward the leading edge of the reed and across the reed leading edge causing the reed to vibrate, the vibration producing a vibratory sound.

20 Claims, 6 Drawing Sheets

(56) References Cited

U.S. PATENT DOCUMENTS

| | | | | |
|---|---|---|---|---|
| 5,575,383 | A | 11/1996 | Seeley | |
| 5,625,347 | A | 4/1997 | MacLean et al. | |
| 6,267,639 | B1 | 7/2001 | Menow et al. | |
| 6,299,006 | B1 | 10/2001 | Samonek | |
| 6,771,165 | B2 | 8/2004 | Burg, II et al. | |
| 8,866,630 | B2 | 10/2014 | Lien et al. | |
| 2005/0178774 | A1 | 8/2005 | Howell | |
| 2008/0083767 | A1 | 4/2008 | O'Neal | |
| 2010/0059516 | A1 | 3/2010 | Parker et al. | |
| 2010/0200535 | A1 | 8/2010 | D'Angelico et al. | |
| 2010/0314390 | A1 | 12/2010 | D'Angelico et al. | |
| 2011/0188229 | A1 | 8/2011 | Hernandez | |
| 2012/0152782 | A1 | 6/2012 | Owens | |
| 2013/0307683 | A1 | 11/2013 | Greenberg et al. | |
| 2014/0166680 | A1 | 6/2014 | St. Gelais | |
| 2015/0321810 | A1* | 11/2015 | Ellison ................. | B65D 51/248<br>222/39 |
| 2016/0229578 | A1* | 8/2016 | Hanan ................ | B65D 41/0421 |

* cited by examiner

SOUND DEVICE FOR BEVERAGE CONTAINER

BACKGROUND OF THE INVENTION

1. Field of the Invention

The present invention relates to a device within a container which produces a sound when the beverage container is opened and, more specifically, to a device within a beverage container for producing a harmonic sound.

2. Description of Related Art

Many beverages are carbonated with carbon dioxide ($CO_2$) or have natural pressurization within the container. When the beverage is in the container, some of this $CO_2$ is dissolved in the beverage and some is at the top of the can. When the can is sealed the pressure inside is higher than the pressure outside, so that when the container is opened, the pressurized gas rushes out the container opening.

Most beers are carbonated with carbon dioxide ($CO_2$). When the beer is in the can, some of this $CO_2$ is dissolved in the beer and some is at the top of the can. The $CO_2$ that is dissolved in the beer is what makes it fizzy. When the can is closed the pressure inside is higher than the pressure outside, so that when you open the can the sudden drop in pressure and the agitation of pouring causes some of the $CO_2$ to bubble out of solution, forming a head on the beer.

SUMMARY OF THE INVENTION

Bearing in mind the problems and deficiencies of the prior art, it is therefore an object of the present invention to provide a device for a beverage container which utilizes the pressurized gas in the container to produce a vibratory sound.

It is another object of the present invention to provide a device which will efficiently produce a sound when a stream of air is passed therethrough.

It is yet another object of the present invention to provide a method for producing a distinct sound when a pressurized beverage container is opened.

It is still another object of the present invention to modify the "tsish" sound created by the escaping air of a carbonated beverage can opening into a harmonic frequency. With the use of a reed, sound is produced from a flow of air being directed against a lamella, which periodically interrupts the airflow and causes the air to be set in motion. A stiffer or more taught reed will produce higher-pitched sounds. Sound is created by the rapid oscillation in air pressure. The direction of the airflow over the opening or the position of the reed over an opening described herein allows for proper reed oscillation.

Still other objects and advantages of the invention will in part be obvious and will in part be apparent from the specification.

The above and other objects, which will be apparent to those skilled in the art, are achieved in the present invention which is directed to a sound producing beverage container including a top surface which includes an opening in the surface initially sealed with a closure, a container bottom and a container wall extending between the top surface and the container bottom. The sound producing beverage container includes a container cavity between the top surface and the container bottom and a reed assembly mounted to the top surface. The reed assembly includes a substantially flat reed having opposing leading and trailing reed edges extending a length of the reed, opposing short reed edges extending between the leading and trailing reed edges, the opposing short reed edges having a width shorter than the length and opposing first and second reed face surfaces extending between the leading and trailing reed edges in one direction and between the opposing short reed edges in a second direction perpendicular to the one direction. The reed first surface is disposed adjacent the top surface of the container. The reed assembly includes a bridge disposed adjacent the reed. The bridge includes opposing leading and trailing bridge edges corresponding with the leading and trailing reed edges and a bulge in the bridge along the leading edge of the bridge, the bulge extending away from the reed. A portion of the leading edge of the reed is disposed between the container top surface and the bridge. A gas moving along the device surface toward the leading edge of the bridge may be directed toward the leading edge of the reed and across the reed leading edge causing the reed to vibrate, the vibration producing a vibratory sound.

The top surface may be a can lid and the sealed opening may be a lid opening initially sealed with a tongue and the bulge extends away from the reed wherein a portion of the leading edge of the reed is disposed between the bridge bulge and the interior surface of the lid. The sound producing beverage container may include an adhesive strip for sealing a portion of the reed bridge to the interior surface of the top. The adhesive strip may seal the bridge along three edges thereof and allowing the gas to travel across a fourth edge and along the first long edge of the reed. The adhesive strip may be substantially flat and include a notch allowing sound to pass therethrough. The bridge is fastened to the interior surface of the top by welding. Welding may be accomplished by spot welding, ultra-sonic welding or any other welding method available. The bridge may be fastened to the interior surface of the top with an adhesive. The bridge may be fastened to the interior surface of the top with fasteners extending through the bridge and the container top. Although the preferred embodiment uses a beverage container, the reed assembly may be implemented on any container that is sealable.

Another aspect of the present invention is directed to a method for producing sound from a pressurized beverage container. The method includes forcing the closure from its sealed position allowing pressurized gas in the container to be released whereby gas travels toward the leading edge of the bridge and is directed across the reed leading edge, producing a vibratory sound.

Another aspect of the present invention is directed to a reed assembly for mounting on a device surface for producing a vibratory sound, the reed assembly including a substantially flat reed. The reed includes opposing leading and trailing reed edges extending a length of the reed and opposing short reed edges extending between the leading and trailing reed edges, the opposing short reed edges having a width shorter than the length. The reed includes opposing first and second reed face surfaces extending between the leading and trailing reed edges in one direction and between the opposing short reed edges in a second direction perpendicular to the one direction. The reed first surface is disposed adjacent a device surface. A bridge is disposed adjacent the reed, the bridge including opposing leading and trailing bridge edges corresponding with the leading and trailing reed edges and a bulge in the bridge along the leading edge of the bridge, the bulge extending away from the reed. A portion of the leading edge of the reed is disposed between the device surface and the bridge. A gas moving along the device surface toward the leading edge of the bridge is directed toward the leading edge of the reed, causing the reed to vibrate, the vibration producing a vibratory sound.

Another aspect of the present invention is directed to a sound producing beverage container having a sound producing device. The sound producing beverage container includes a top and a bottom and a cavity therebetween. The sound producing device including a hole positioned in the pressurized gas device so that the hole is not submerged in the beer or beverage. The hole is located in the sound producing device portion not submerged in the beverage. The sound producing device may include a whistle or other sound producing element disposed over the hole so that when the beverage container is opened using a tab which moves a seal, from an opening, the pressure inside the beverage container drops and nitrogen or other inert gas is forced out of the pressurized sound producing device creating a sound such as a whistle.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

Description of the Embodiment(s)

In describing the embodiment(s) of the present invention, reference will be made herein to FIGS. 1-18 of the drawings in which like numerals refer to like features of the invention.

Figure 1:
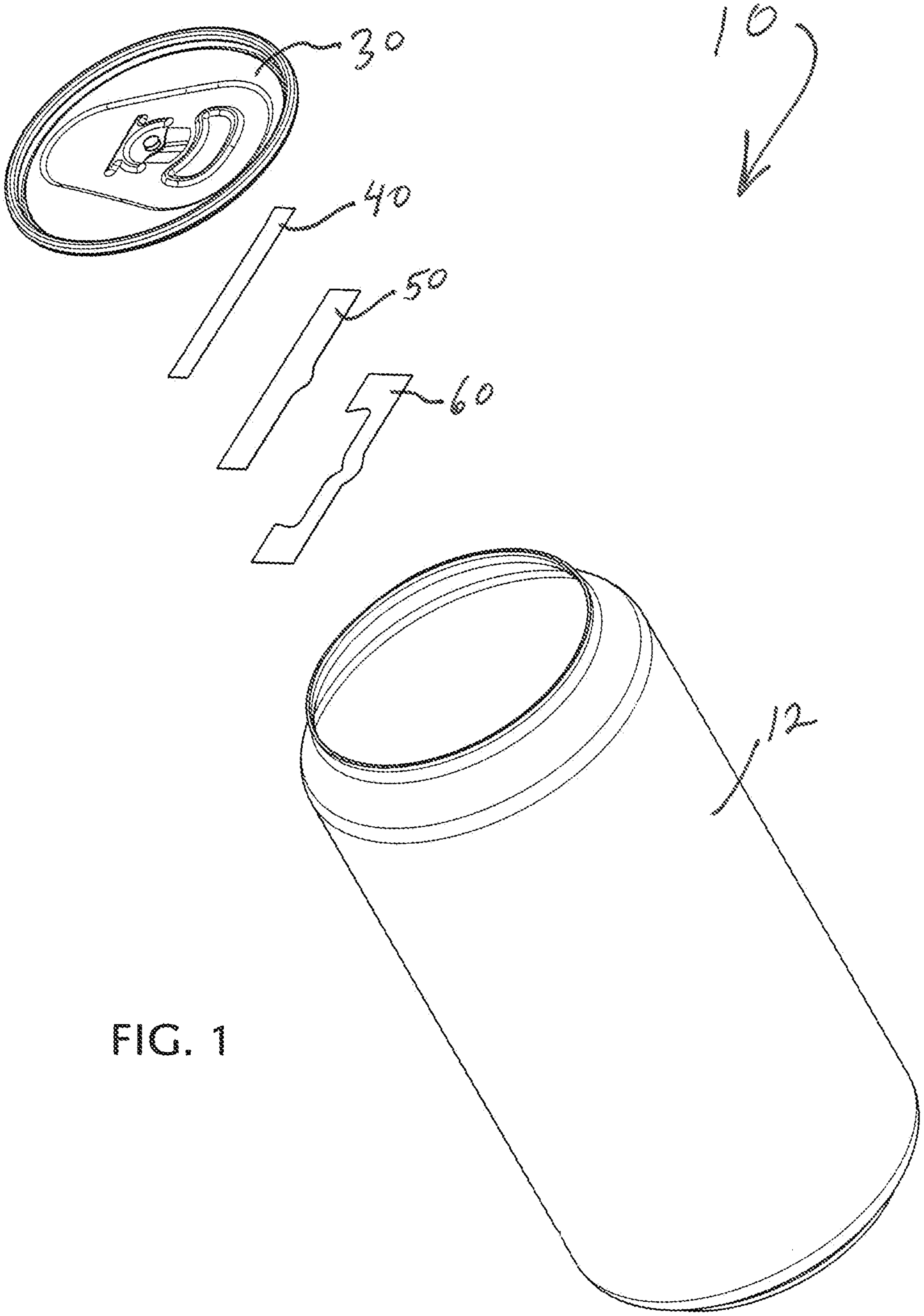
FIG. 1 is an exploded top perspective view of the sound producing beverage container according to the present invention.
Figure 3:
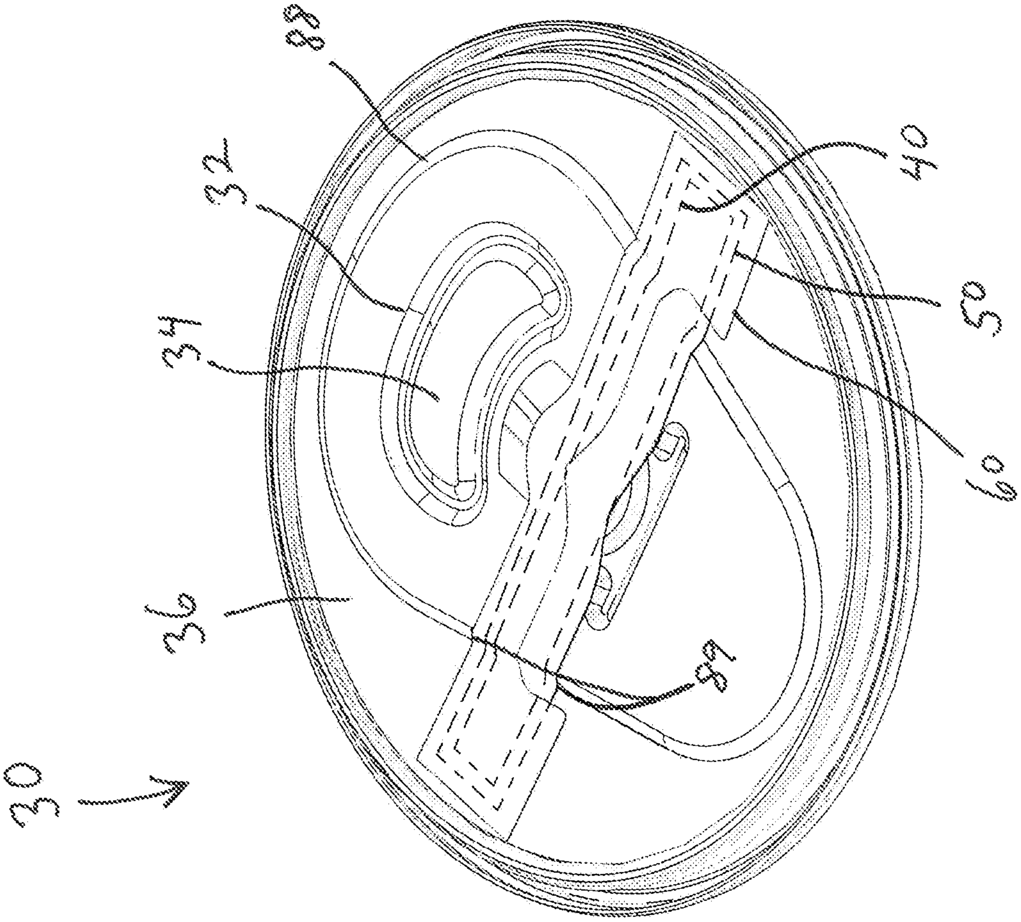
FIG. 3 shows the interior surface of the container top with the reed assembly according to the present invention.
Figure 2:
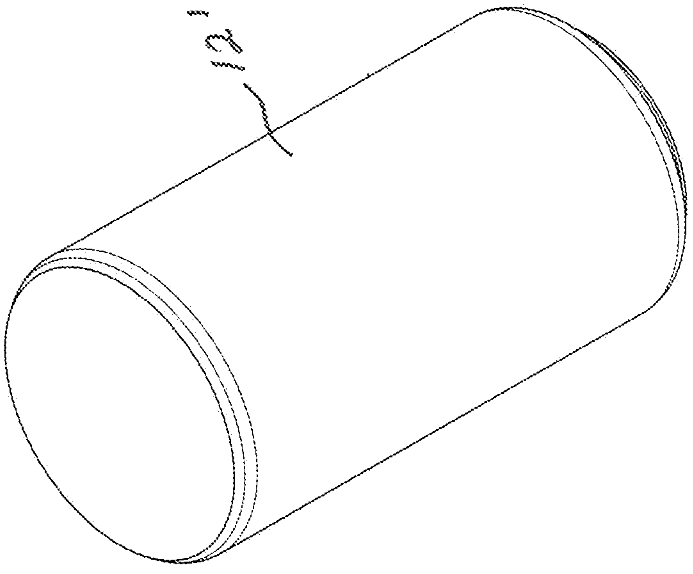
FIG. 2 shows a second embodiment of the container wall.
Figure 4:
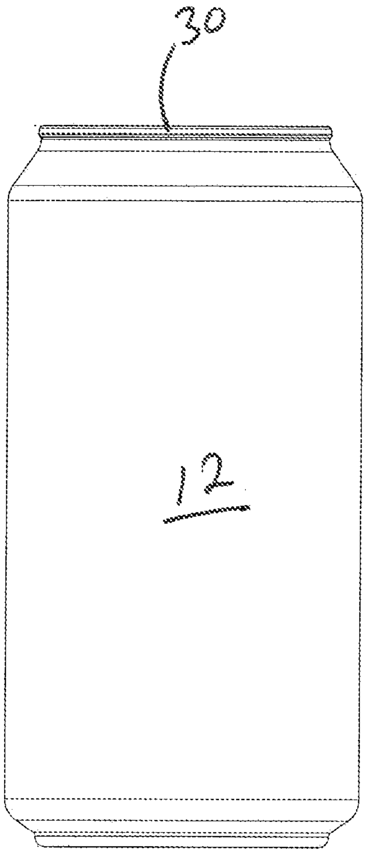
FIG. 4 is a top plan view of the sound producing beverage container shown in FIG. 1 without the tab shown.
Figure 5:
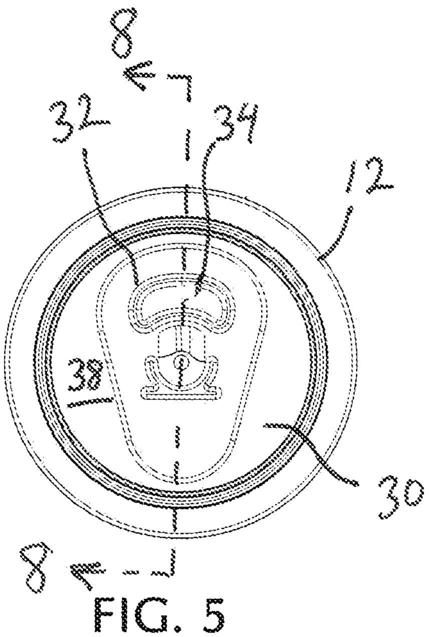
FIG. 5 is a bottom plan view of the sound producing beverage container shown in FIG. 1.
Figure 6:
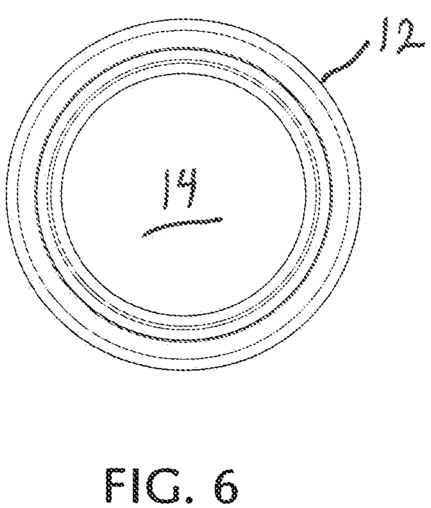
FIG. 6 is a top view of the sound producing beverage container shown in FIG. 1 with the tab shown.
Figure 7:
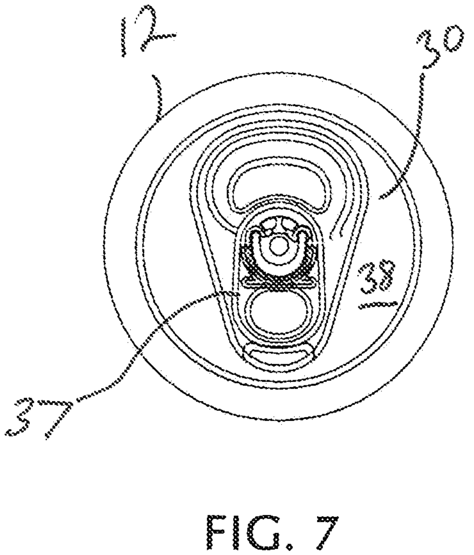
FIG. 7 is a front elevational view of the sound producing beverage container shown in FIG. 1.
Figure 11:
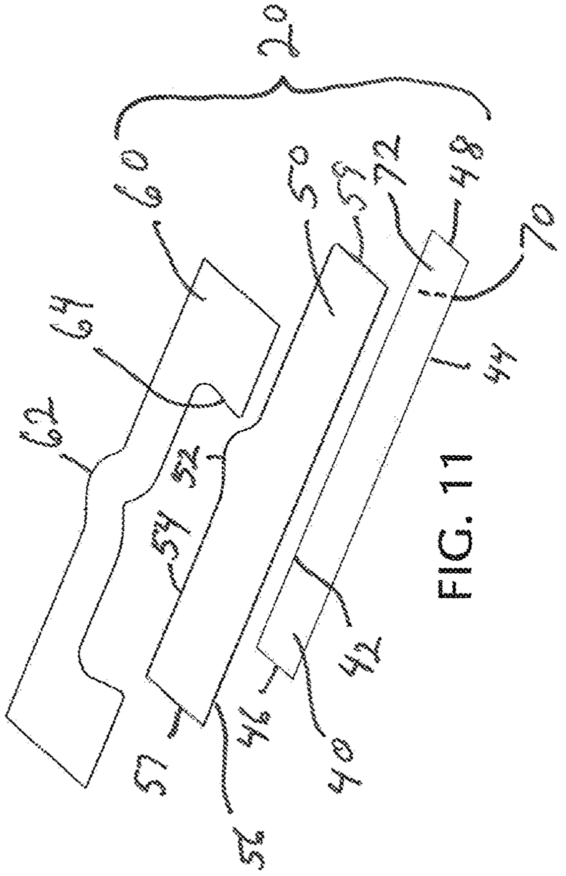
FIG. 11 is an exploded perspective view of the reed assembly according to the present invention.
Figure 12:
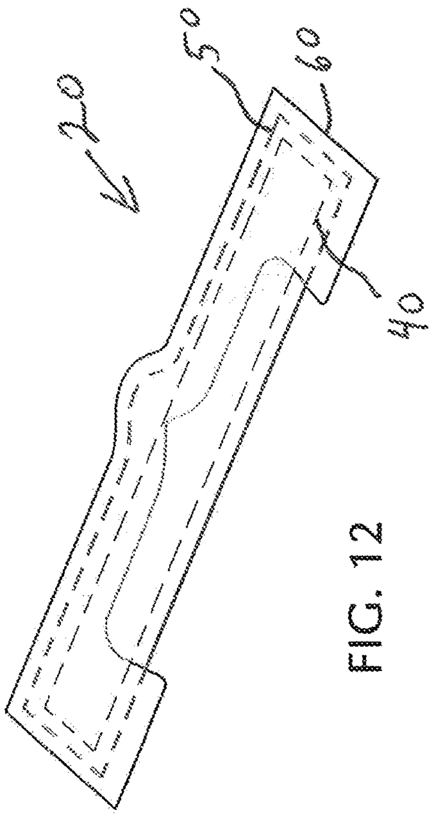
FIG. 12 is a perspective view of the reed assembly shown in FIG. 11.
Figure 8:
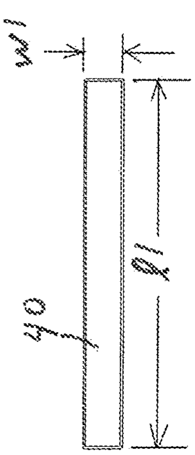
FIG. 8 is a top plan view of the reed according to the present invention.
Figure 9:
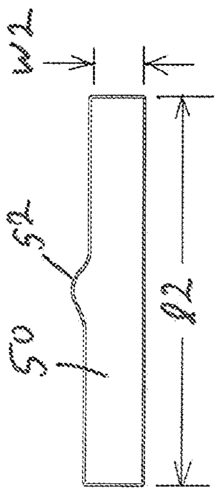
FIG. 9 is a top plan view of the bridge according to the present invention.
Figure 10:
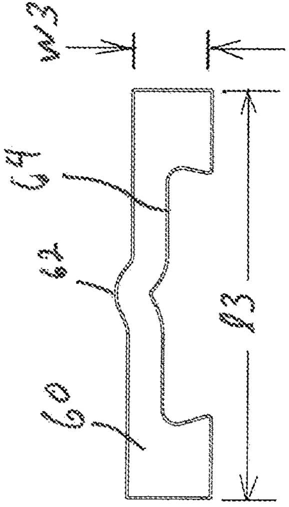
FIG. 10 is a top plan view of the adhesive according to the present invention.

As shown in FIGS. 1-16, the present invention is a sound producing beverage container 10. FIG. 1 shows an exploded perspective view of the sound producing beverage container 10 including a container top 30 shown in greater detail in FIG. 3. The sound producing beverage container 10 includes an opening 32 extending through the container top 30, the opening 32 initially sealed with a closure 34 such as a tongue found on a standard soda can. The sound producing beverage container 10 includes a container bottom 14 and a container wall 12 extending between the top 30 and the container bottom 14. FIG. 2 shows an alternate embodiment of the container wall 12'. FIGS. 4-7 show elevational and plan views of the exterior of the sound producing beverage container 10 and FIGS. 8-10 show plan views of the reed assembly components. FIG. 7 shows a tab 37 which is secured to the container top 30 and is used as a lever to break the seal made by the closure 34 in the opening 32. FIG. 11 shows an exploded perspective view of the reed assembly 20 and FIG. 12 shows the assemble perspective view of the reed assembly 20. The sound producing beverage container 10 includes a container cavity between the top 30 and the container bottom 14 and a reed assembly 20 mounted to the top 30. Preferably, the reed assembly is disposed on the interior surface 36 of the top 30, although the reed assembly may alternately be attached on the exterior surface 38 of the top 30. The reed assembly includes a substantially flat reed 40 having opposing leading reed edge 42 and trailing reed edge 44 extending a length l of the reed 40, opposing short reed edges 46, 48 extending between the leading and trailing reed edges 42, 44, the opposing short reed edges 46, 48 having a reed width w shorter than the length l. The reed 40 includes opposing first and second reed face surfaces 70, 72 extending between the leading and trailing reed edges 42, 44 in one direction and between the opposing short reed edges 46, 48 in a second direction perpendicular to the one direction. The reed first surface 70 is disposed adjacent the interior surface 36 of the top 30. The reed assembly 20 includes a bridge 50 disposed adjacent the reed 40. The bridge 50 includes opposing leading and trailing bridge edges 54, 56 corresponding with the leading and trailing reed edges 42, 44. The bridge 50 includes a bulge 52 in the bridge 50 along the leading edge 54 of the bridge 50, the bulge 52 extending away from the reed 40. A portion of the leading edge 42 of the reed is disposed between the interior surface 36 of the top 30 and the bridge 50. A gas moving along the container top 30 toward the leading edge 54 of the bridge 50 may be directed by the bridge bulge 52 toward the reed leading edge 42 and across the reed leading edge 42 causing the reed 40 to vibrate, the vibration producing a vibratory sound. The container top 30 includes an indented top portion 88 which includes the opening 32 and closure 34. The indented top portion 88 is deeper inside the container that the other portions of the container top 30. In viewing the indented top portion 88 from the interior surface 36 as in FIG. 3, it can be seen that the indented portion provides a lip 89 which allows the reed to be tight against the bridge 50 or tight against the interior surface 36 of the container top 30. This provides a more consistent sound when the reed vibrates. Although the preferred embodiment uses a beverage container, the reed assembly may be implemented on any container that is sealable.

The exploded view of FIG. 11 shows the reed assembly 20 components positioned in relation to one another. The reed 40 has a reed length l1 which is preferably shorter than the bridge length l2 which is preferably shorter than the adhesive strip length l3. Likewise, the reed 40 has a reed width w1 which is preferably shorter than the bridge width w2 which is preferably shorter than the adhesive strip width w3.

The top 30 may be a can lid and the sealed opening may be a lid opening initially sealed with a closure 34 such as a tongue wherein the bridge bulge 52 extends away from the reed 40, a portion of the reed leading edge 42 disposed between the bridge bulge 52 and the interior surface of the lid 36. The reed assembly 20 of the sound producing beverage container 10 may include an adhesive strip 60 for sealing a portion of the reed bridge 50 to the interior surface 36 of the top 30. The adhesive strip 60 may seal the bridge 50 along three edges 56, 57 and 59 of the bridge 50 and allowing the gas to travel across the reed leading edge 42 and along the first long edge of the reed. The adhesive strip 60 may be substantially flat and include a notch 64 allowing the gas and sound to pass therethrough. The bridge 50 is fastened to the interior surface 36 of the top 30 by welding. Welding may be accomplished by spot welding, ultra-sonic welding or any other welding method available. The bridge 50 may be fastened to the interior surface 36 of the top 30 with an adhesive. The bridge 50 may be fastened to the interior surface 36 of the top 30 with fasteners extending through the bridge 50 and the container top 30.

Figure 15:
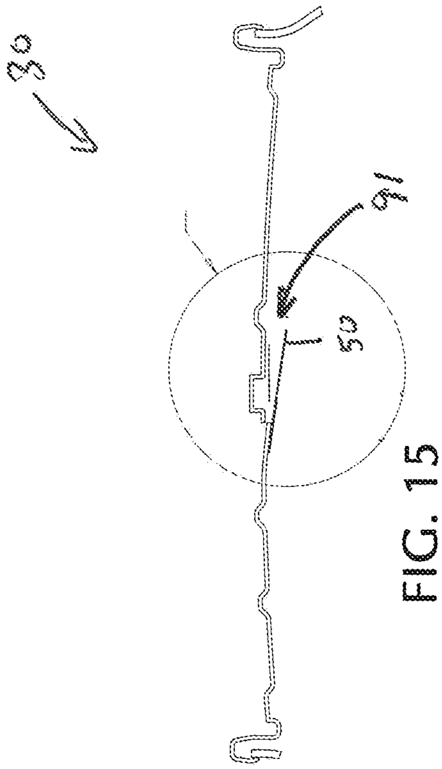
FIG. 15 is a cross-sectional detail of the container top shown in FIG. 14.
Figure 16:
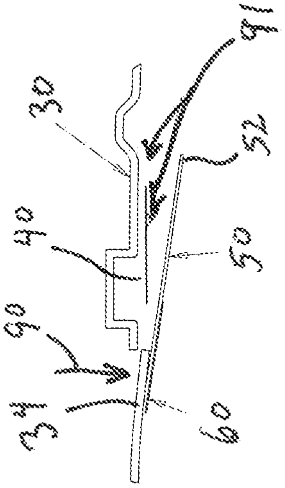
FIG. 16 is a larger detail of a portion of the container top shown in FIG. 14.
Figure 14:
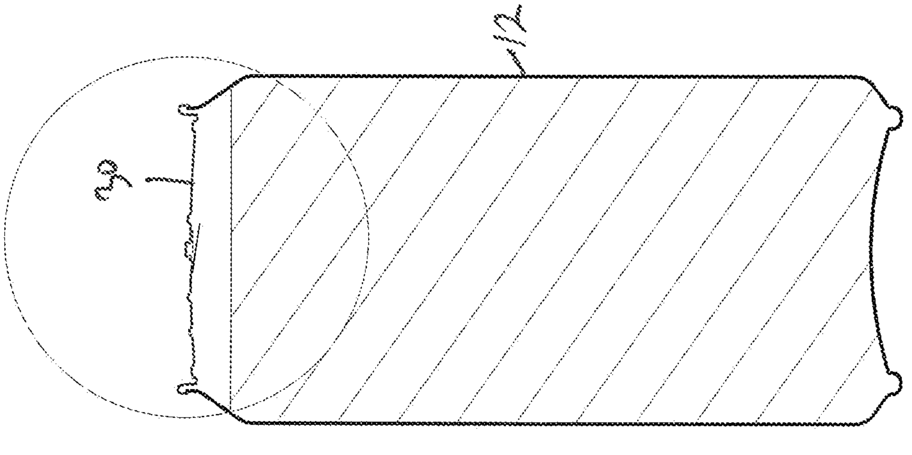
FIG. 14 is a cross sectional side view along cut lines 8-8 of FIG. 5 of the sound producing beverage container shown in FIG. 13 with the can top rim removed for clarity.
Figure 13:
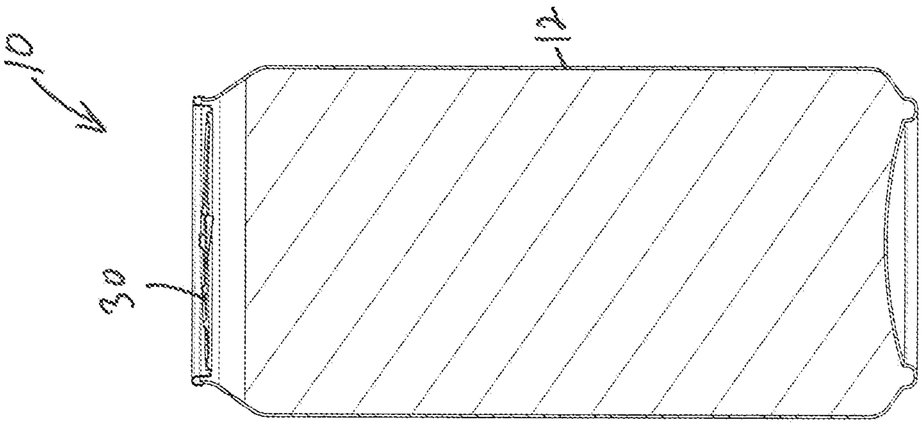
FIG. 13 is a cross sectional side view along cut lines 8-8 of FIG. 5 of the sound producing beverage container.

Another aspect of the present invention is directed to a method for producing sound from a pressurized beverage container 10 as described herein. FIGS. 13-16 show elevational side views with various degrees of detail in the container top 30, the cross section along the center of the can. FIGS. 13 and 14 are cross sectional side views along cut lines 8-8 of FIG. 5 of the sound producing beverage container. FIGS. 15 and 16 show details of the container top 30. The method includes forcing the closure 34 from its sealed position in the direction of arrow 90 and allowing pressurized gas in the container 10 to be released in the direction of arrow 91 whereby gas travels toward the bridge leading edge 54 and is directed across the reed leading edge 42, producing a vibratory sound. Since the pressure inside the container 10 is greater than the atmospheric pressure outside the container when the container is in the closed position, moving the closure 34 to the open position as shown in FIGS. 15 and 16 forces the gas from the container interior toward the bridge bulge 52 since the bridge is sealed against the container top 30 along the bridge edges 56, 57 and 59 with no seal along the leading edge 54 where the bulge 52 is disposed. The bulge 52 then diverts the gas across the reed leading edge 42 and through the opening 32 of the container top 30.

Another aspect of the present invention is directed to a reed assembly for mounting on a device surface for producing a vibratory sound, the reed assembly 20 including a substantially flat reed 40. The reed 40 includes opposing leading and trailing reed edges 42, 44 extending a length l1 of the reed 40 and opposing short reed edges 46, 48 extending between the leading and trailing reed edges 42, 44, the opposing short reed edges 46, 48 having a width w1 shorter than the length l1. The reed 40 includes opposing first and second reed face surfaces 70, 72 extending between the leading and trailing reed edges 42, 44 in one direction and between the opposing short reed edges 46, 48 in a second direction perpendicular to the one direction. The reed first surface 70 is disposed adjacent a device surface and a bridge 50 is disposed adjacent the reed second surface 72. The bridge 50 includes opposing leading and trailing bridge edges 54, 56 corresponding with the leading and trailing reed edges 42, 44 and a bulge 52 in the bridge 50 along the bridge leading edge 54, the bulge 52 extending away from the reed 40. A portion of the reed leading edge 42 is disposed between the device surface and the bridge 50. A gas moving along the device surface toward the bridge leading edge 54 is directed toward the reed leading edge 42, causing the reed 40 to vibrate, the vibration producing a vibratory sound. As shown in FIGS. 6-12, the reed 40 has a reed length l1 which is preferable shorter than the bridge length l2 which is preferably shorter than the adhesive strip length l3. Likewise, the reed 40 has a reed width w1 which is preferable shorter than the bridge width w2 which is preferably shorter than the adhesive strip width w3.

Items used in development and testing 1. 12 oz Aluminum Cans & Ends Standard B64
2. Clear Plastic Wrap (Glad Cling Wrap)
3. Plastic clips
4. Rubber sheet (1/16 thick 30A hardness)
5. Air compressor with air blow gun
6. 2271K1—Kapton® Polyimide Film, .001" Thick, 12"× 12"
7. Transparency Film for Inkjet Printers Clear (Apollo VCG7033S)
8. Painter's Plastic (approximately 0.0005" thick, Berry Plastics 752509)
9. Polyethylene sheet 2, 4 and 6 mil thick
10. Cyanoacrylate adhesive
11. SodaStream carbonation tool
12. Water
13. Adhesive tape (Scotch Magic Tape, 3/4×1000 Inches (810K6))
14. Air compressor with air blow gun, foot pedal switch and pressure gauge
15. O-rings (-012)
16. DB MeterPro sound measuring app (on Apple iPhone)

Procedure/Method

Initial tests were conducted to get a sense of the materials, variables and sounds. For the reed test, a bird call was used as a starting point, which lead to a basic reed made of plastic film, which were affixed to a can lid with clamps. Air was directed over the plastic film at an angle of approximately 45°. This created an audible frequency.

The initial Reed tests showed that a thin piece of plastic film stretched over the bottom of the can lid created some nice sounds. The center depression created by affixing the tab to the can lid was identified as a potentially important feature in creating a "chirp" (audible frequency). Various film thicknesses were tested from .001 to .005 inches. Rigid and flexible films were tested as well. The .001-thick Polyimide film provided the best balance of sound and repeatability. A can lid was partially opened to simulate the initial opening of a can. Short bursts of air were released over the reed and opening by blowing. These tests covered a range of film widths from 0.1 to 0.3 inches in 0.05-inch increments. Proper positioning of the film over the center depression and the opening allows an audible tone. One of the reed films was adhered to an unopened can in a chosen position with Cyanoacrylate adhesive. The can was filled with carbonated water and sealed with the altered lid. Opening the can produced no sound. The reed requires air flow within a critical angle. A fluid management element was theorized to be required.

Proof-of-Concept Tests

The intermediate Reed tests showed that a rigid narrow strip of 0.001-inch polyamide film produces a nice sound but does not resonate within a sealed can when opened. Air escapes from the small hole in the can opening without passing by the reed. The air flow must be directed over the reed to produce harmonic sound. By placing a thicker film (0.004 inches) "bridge" over the reed and the can opening, airflow can be directed over the reed. The reed was adhered to a partially-opened can lid with adhesive tape on the left and right sides without extending the tape onto the central raised platform of the can lid. Some tension was applied to the reed when adhered. The bridge was placed over the reed and adhered in the same manner. Another length of adhesive tape was placed along the side opposite the hole opening (on the tongue of the can lid) to prevent airflow along this edge.

A 3/8-inch hole was drilled into the bottom of the can and placed on the air blow gun with an O-ring placed between to help seal the can at the bottom. The air was regulated to 30 psi, which is similar to that found within a can filled with carbonated fluid. A foot pedal allowed hands-free air control. The lid was placed firmly on the can by hand to minimize air escaping around the can lid.

Proof-of-Concept Test 1

The initial test produced no noticeable harmonic sound. Small (0.020-inch) steel rods were placed between the reed and the bridge. A faint sound with a broad harmonic peaking at 3400, 9000, and 17,800 Hz was produced. Additional (0.020-inch) steel rods were placed between the can lid and the reed. A similar sound with a somewhat narrower harmonic peaking at 4600, 9000, and 17,800 Hz was produced.

While encouraging results were obtained, the broad distribution of frequencies produced a slight whistle with mostly noise. The steel rods helped allow air to flow over the reed and for the reed to vibrate. Steel rods are not desirable for a mass-produced product. Creasing the bridge allows a similar result.

Proof-of-Concept Test 2

The bridge was creased near the mid-point on both the left and right side of the centerline. When placed on the can lid, the center portion is raised allowing air to escape. A similar attachment to the prior tests was employed with the same procedure. A narrower harmonic peaking at 3600 and 6800 Hz was produced giving a distinct whistling sound.

Observations

The small opening created on a standard aluminum can lid allows for air to escape in a controlled location. Air-flow management is important to achieve an oscillation and thus harmonic frequency in the reed. The reed must be allowed to vibrate; the air-flow element(s) should allow for this space. Creasing a film allows for air to pass over the reed in a controlled direction and allows room for the reed to vibrate without additional components. Sealing an area around the reed helps direct air flow over the reed. Layers can be mass-produced using standard film-conversion processes. The adhesive layer placed over the bridge layer might be replaced with an adhesive layer between the reed and the bridge. This may reduce part cost and thus reduce manufacturing costs.

The conclusion is that a distinct whistling sound can be produced using low-cost manufacturing processes on a standard B64 can lid with a reed and air-flow management element. A similar result should be obtainable with any can that has a consistent opening area.

Figure 17:
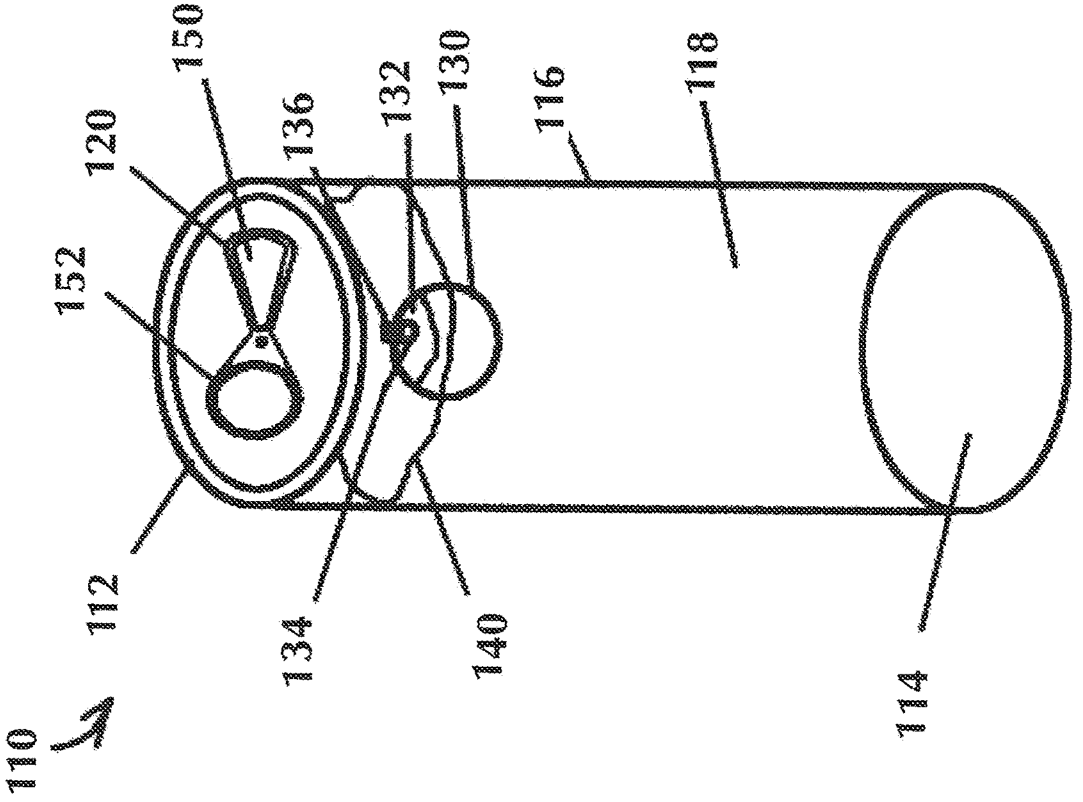
FIG. 17 is a perspective view of a second embodiment of the sound producing beverage container with the closure in a closed position.
Figure 18:
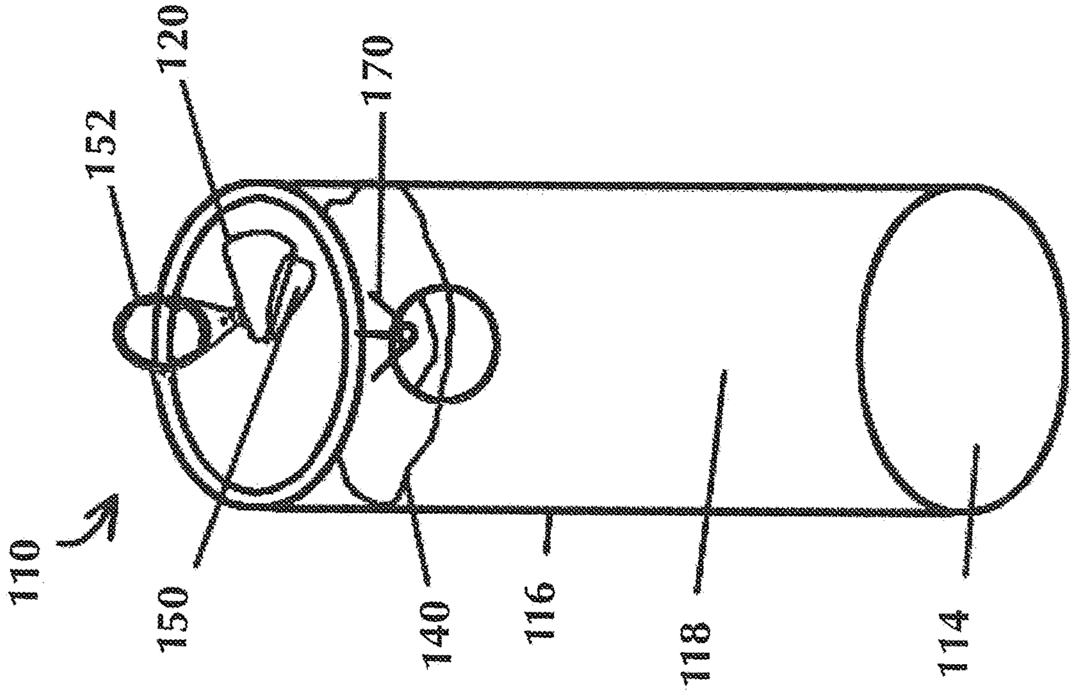
FIG. 18 is a perspective view of the second embodiment of the sound producing beverage container shown in FIG. 17 with the closure in an opened position.

Another embodiment of the present invention as shown in FIGS. 17 and 18 is a sound producing beverage container 110 having a sound producing device 130. The sound producing beverage container 110 includes a top 112 and a bottom 114 and a cavity 18 therebetween. The sound producing device 130 including a hole 134 positioned in the pressurized gas device 116 so that the hole 134 is not submerged in the beer or beverage 140. The hole 134 is located in the sound producing device 130 portion 132 not submerged in the beverage 140. The sound producing device 130 may include a whistle 136 or other sound producing element disposed over the hole 134 so that when the beverage container 110 is opened using a tab 152 which moves a seal 150, from an opening 120, the pressure inside the beverage container 110 drops and nitrogen or other inert gas 170 is forced out of the pressurized sound producing device 130 creating a sound such as a whistle.

Thus, the present invention provides one or more of the following advantages:

The invention provides a device for a beverage container which utilizes the pressurized gas in the container to produce a vibratory sound.

The invention provides a device which will efficiently produce a sound when a stream of air is passed therethrough.

The invention provides a method for producing a distinct sound when a pressurized beverage container is opened.

The invention modifies the "tsish" sound created by the escaping air of a carbonated beverage can opening into a harmonic frequency. Sound is produced from a flow of air being directed against a lamella, which periodically interrupts the airflow and cause the air to be set in motion. A stiffer or more taught reed will produce higher-pitched sounds. Sound is created by the rapid oscillation in air pressure.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A sound producing beverage container comprising:
- a container top including an opening initially sealed with a closure;
- a container bottom;
- a container wall extending between the container top and the container bottom;
- a container cavity between the container top and the container bottom; and
- a reed assembly mounted to the container top, the reed assembly comprising:
  - a substantially flat reed including:
    - opposing leading and trailing reed edges extending a length of the reed;

opposing short reed edges extending between the leading and trailing reed edges, the opposing short reed edges having a width shorter than the length; and opposing first and second reed face surfaces extending between the leading and trailing reed edges in one direction and between the opposing short reed edges in a second direction perpendicular to the one direction;

wherein a reed first surface is disposed adjacent the container top; and a bridge disposed adjacent the reed, the bridge including:

opposing leading and trailing bridge edges corresponding with the leading and trailing reed edges; and a bulge in the bridge along the leading edge of the bridge, the bulge extending away from the reed;

wherein a portion of the leading edge of the reed is disposed between the container top and the bridge;

wherein a gas moving along the container top toward the leading edge of the bridge may be directed toward a leading edge of the reed and across the leading edge of the reed causing the reed to vibrate, the vibration producing a vibratory sound.

2. The sound producing beverage container according to claim 1 wherein the container top is a can lid and the sealed opening is lid opening initially sealed with a tongue and the bulge extends away from the reed wherein a portion of the leading edge of the reed is disposed between the bridge bulge and an interior surface of the lid.

3. The sound producing beverage container according to claim 1 including an adhesive strip for sealing a portion of the reed bridge to an interior surface of the lid, the adhesive strip sealing the bridge along three edges thereof and allowing the gas to travel across a bridge fourth edge and along the leading edge of the reed.

4. The sound producing beverage container according to claim 1 including an adhesive strip for sealing the reed bridge to an interior surface of the container top, the adhesive strip being substantial flat and including a notch allowing sound to pass therethrough.

5. The sound producing beverage container according to claim 1 wherein the bridge is fastened to an interior surface of the container top by welding.

6. The sound producing beverage container according to claim 1 wherein the bridge is fastened to an interior surface of the container top with an adhesive.

7. The sound producing beverage container according to claim 1 wherein the bridge is fastened to an interior surface of the container top with fasteners extending through the bridge and the container top.

8. The sound producing beverage container according to claim 1 wherein the bridge is fastened to an interior surface of the container top by ultra-sonic welding along ends of the bridge.

9. The sound producing beverage container according to claim 1 wherein the bridge is fastened to an interior surface of the container top along three edges of the bridge.

10. The sound producing beverage container according to claim 1 wherein the bridge is fastened to an interior surface of the container top mechanically.

11. A sound producing beverage container comprising:

a container top including an opening initially sealed with a closure;

a container bottom;

a container wall extending between the container top and the container bottom;

a container cavity between the container top and the container bottom; and a reed assembly mounted to the container top, the reed assembly comprising:

a substantially flat reed including opposing leading and trailing reed edges extending a length of the reed;

opposing first and second reed face surfaces extending between the leading and trailing reed edges; and a bridge disposed adjacent the reed, the bridge including opposing leading and trailing bridge edges corresponding with the leading and trailing reed edges and a bulge in the bridge along the leading edge of the bridge, the bulge extending away from the reed wherein a portion of the leading edge of the reed is disposed between the bridge bulge and the container top;

wherein a pressurized gas escaping the container cavity and moving along the container top toward the leading edge of the bridge is directed toward the leading edge of the reed and across the reed leading edge resulting in the reed vibrating, the vibration generating a harmonic frequency that outputs a harmonic sound.

12. The sound producing beverage container according to claim 11 wherein the substantially flat reed comprises a stiff reed to produce a higher-pitched harmonic sound.

13. The sound producing beverage container according to claim 11 wherein the reed assembly is mounted to an exterior surface of the container top.

14. The sound producing beverage container according to claim 11 wherein the reed assembly is mounted to an interior surface of the container top.

15. The sound producing beverage container according to claim 11 further including opposing short reed edges extending between the leading and trailing reed edges, the opposing short reed edges having a width shorter than the length.

16. The sound producing beverage container according to claim 11 wherein the first and second reed face surfaces extend between the leading and trailing reed edges in one direction and between opposing short reed edges in a second direction perpendicular to the one direction.

17. The sound producing beverage container according to claim 11 wherein the container top includes an indented top portion that is deeper inside the container than other portions of the container top.

18. The sound producing beverage container according to claim 17 wherein the opening and closure reside at the indented top portion.

19. The sound producing beverage container according to claim 17 wherein the reed assembly is mounted to an interior surface of the container top wherein the indented portion provides a lip that enables the reed to be tight against the bridge.

20. The sound producing beverage container according to claim 19 wherein the lip further enables the reed to be tight against the interior surface of the container top.

* * * * *